WIDE BANDWIDTH PHASE EQUALIZATION FILTER NETWORK

Filed Aug. 13, 1965

INVENTORS.
JOSEPH BURNSWEIG, JR.,
BERT J. FAIRBANKS,
ALBERT A. ROLSTEAD,
BY J. K. Haskell,
ATTORNEY.

United States Patent Office 3,421,121

Patented Jan. 7, 1969

3,421,121

WIDE BANDWIDTH PHASE EQUALIZATION FILTER NETWORK

Joseph Burnsweig, Jr., Los Angeles, Bert J. Fairbanks, Canoga Park, and Albert A. Rolstead, Torrance, Calif., assignors to Hughes Aircraft Company, Culver City, Calif., a corporation of Delaware Filed Aug. 13, 1965, Ser. No. 479,384

U.S. Cl. 333—75 7 Claims

Int. Cl. H01h *7/08;* H03h *5/00*

ABSTRACT OF THE DISCLOSURE

The filter network comprises a plurality of cascaded individual bridged-T filter circuits forming an all-pass network. Each circuit utilizes inductive-capacitive filter arrangement having low resistance and the plurality of circuits are physically arranged to have a minimum of inductive and capacitive coupling. The physical arrangement is geometric to obtain low insertion loss, specified circuit loading and the low reflection losses. Each bridged-T circuit operates at a particular frequency of the incoming signal. The invention provides a greater than fifty percent bandwidth phase equalization.

This invention relates to phase equalization filter networks and more particularly to phase equalization filter networks providing large percentage bandwidth phase equalization at intermediate frequencies.

Prior technology has not overcome the obstacles which have prevented phase equalization filter networks from being capable of producing large percentage, i.e., greater than fifty percent, bandwidth phase equalization at intermediate frequencies. Previous devices have been limited to low percentage, i.e., less than fifty percent, bandwidth in systems utilizing either fixed, linear, or non-linear time delay equalization networks. An example of this percentage bandwidth limitation is the pulse compression filters incorporated in pulse compression radar systems. Pulse compression radar, or chirp radar, is a technique for increasing the average power capability of pulsed radar signals without subsequent increased peak power and still providing effective narrow pulse resolution. In a typical pulse compression radar system, energy is dispersed in time during transmission and recompressed in time upon reception by employment of said filters.

Characteristics exhibited in these early dispersive filters necessitated that the networks comprising such filters be enclosed in individual metal shielding containers with connections into and out of said containers via powdered iron cores and coils. In addition, each all-pass network required extensive shielding. Furthermore, additional networks had to be employed to equalize the amplitude characteristics and insure linear time dispersion across the frequency region.

It is therefore an object of this invention to provide an improved phase equalization network that results in large percentage bandwidth phase equalization at intermediate frequencies.

It is a further object of this invention to provide an improved phase equalization filter network in which reactive coupling is minimized.

It is a still further object of this invention to provide improved facilities permitting coupling between individual bridged-T circuits that results in less attenuation per megacycle.

It is another object of this invention to provide an improved phase equalization network for systems of the character referred to that minimizes the subsequent amplitude equalization network requirements.

It is still another object of this invention to provide an improved and simplified chassis construction for networks of the character referred to that enables expeditious production type initial alignment and tuning.

Briefly, in accordance with this invention, techniques are employed to solve the difficult problem of producing a phase equalization filter device capable of large percentage bandwidth phase equalization at intermediate frequencies. The filter device comprises cascaded filter circuits forming an all-pass network having practical circuit and geometric configurations to produce closely the theoretically predicted result. The all-pass network utilizes inductive-capacitive filter circuits having low resistance and physically arranged to have a minimum of inductive and capacitive coupling. These circuits are electrically cascaded in a specific geometric arrangement to obtain low insertion loss, specified circuit loading and low reflection losses. Each filter circuit comprises a plurality of inductors and capacitors in a bridge-T circuit arrangement. Adjacent inductors are physically arranged in positions in which the magnetic fields of such adjacent inductors are in quadrature to each other to provide minimum inductive coupling. The filter circuits are assembled in a sequence determined by the frequency band pass of each network in close physical proximity in relative positions affording a minimum of inductive coupling with the adjacent bridged-T circuits. Then the filter circuits are electrically coupled together by wires that resonate with terminal reactance at the particular frequencies in order to minimize the circuit coupling losses. Thus, the integrated filter device is capable of providing large percentage bandwidth phase equalization for either fixed, linear, or non-linear time delay use in the intermediate frequency range.

Additional objects and advantages will be apparent from a study of the following description taken in connection with the accompanying drawings, in which like characters refer to like parts, and in which.

Figure 1:
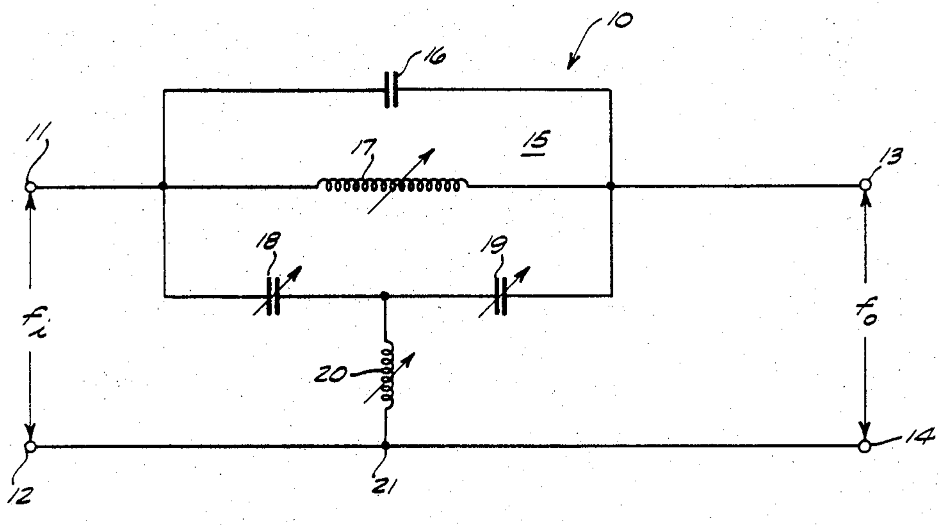
FIGURE 1 is a schematic diagram of a prior art type of bridged-T circuit embodied in this invention.

Referring to FIGURE 1, there is shown a type of bridged-T circuit 10, used in practicing this invention. This circuit 10 has apair of input terminals 11 and 12 to which the intermediate frequency signal $f_1$ is applied. An intermediate frequency signal $f_0$ appears across a pair of output terminals 13 and 14. A resonant circuit 15 is connected between input terminal 11 and output terminal 13. The resonant circuit 15 comprises three parallel paths:

The first path having a capacitor 16, the second path having a tunable inductor 17, and the third path having two serially connected tunable capacitors 18 and 19. A tunable inductor 20 is connected between the capacitors 18 and 19 and a point of common reference potential 21.

In accordance with this invention, high Q (1000) capacitors 16, 18 and 19, and high Q (300–400) inductors 17 and 20 are selected to obtain low insertion loss, specified circuit loading and low reflection losses, i.e., the prescribed design performance of a double terminated matched phase equalizer.

Figure 2:
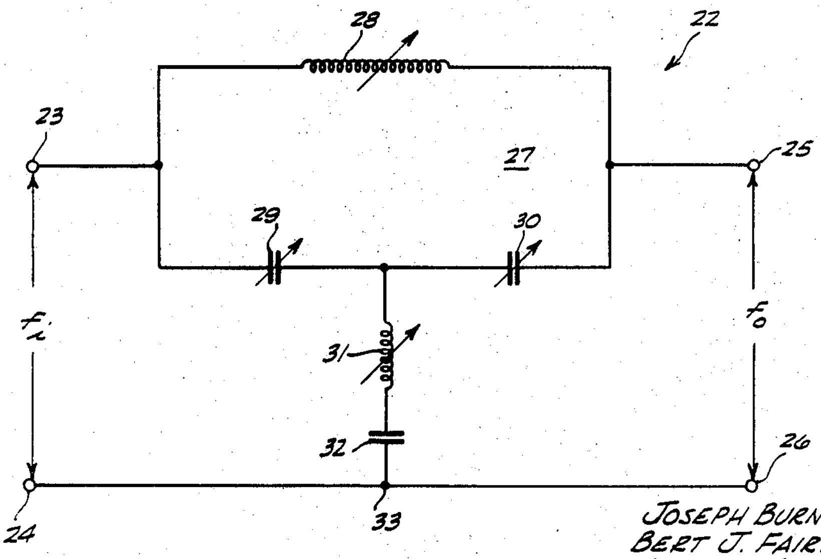
FIGURE 2 is a schematic diagram of a slightly different type of prior art bridge-T circuit embodied in this invention.

The circuit 10 is not the only bridged-T configuration which may be utilized to fulfill the objects of this invention. Referring to FIGURE 2, there is shown a different bridged-T circuit 22. This circuit 22 has a pair of input terminals 23 and 24 to which the intermediate frequency signal $f_i$ is applied. An intermediate frequency signal $f_o$ appears across a pair of output terminals 25 and 26. This intermediate frequency signal is typically in the 5 to 200 megacycle range. A resonant circuit 27 is connected between the input terminal 23 and the output terminal 25. The resonant circuit 27 comprises two parallel paths: The first path having a tunable inductor 28, and the second path having serially connected tunable capacitors 29 and 30. A tunable inductor 31 and a capacitor 32 are serially connected between the capacitors 29 and 30 of the second path and a point of common reference potential 33. The capacitors and inductors of this bridged-T circuit have the same characteristics of the ones utilized in the bridged-T circuit of FIGURE 1.

Furthermore, since the publication of "Network Analysis and Feedback Amplifier Design" by H. Bode, D. Van Nostrand Co., New York, 1945, it has been well known to the art that bridged-T circuits described are capable of phase adjustment or equalization, i.e., elimination of non-linear circuit phase distortion at a high frequency portion of the intermediate frequency signal. While only two schematic configurations of a bridged-T circuit have been shown and described, other variations may be employed.

Figure 3:
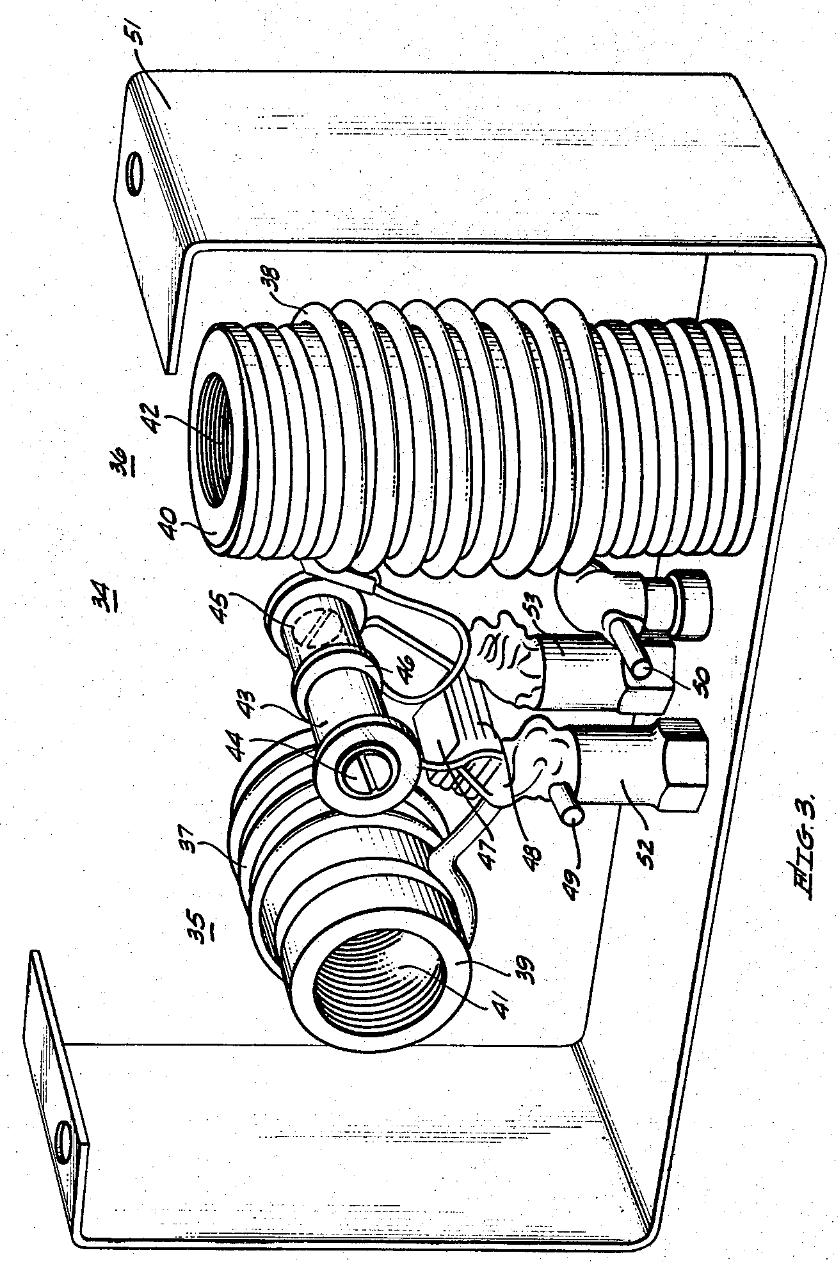
FIGURE 3 illustrates an embodiment of a filter circuit constructed according to this invention affording minimum inductive coupling.

Referring now to FIGURE 3 there is shown the physical arrangement of bridged-T circuit 34. Bridged-T circuit 34 represents the physical configuration of schematic bridged-T circuit 10 of FIGURE 1, but is typically illustrative of any other modified bridged-T circuits. The input to such bridged-T circuit 34 is applied to the input terminals 49 and 50 (designated in FIGURE 1 as 11 and 12, and in FIGURE 2 as 23 and 24, respectively).

The specific physical layout of each bridged-T circuit is critical. The inductors 35 and 36 (designated in FIGURE 1 and 17 and 20, and in FIGURE 2 as 28 and 31, respectively) are arranged in relative positions in which the magnetic fields of said inductors are in quadrature to each other. This quadrature arrangement, which is assured by attaching the inductors to a metal base 51 by some conventional mounting means, minimizes inductive coupling between the inductors. Furthermore, minimizing of capacity and coil losses is accomplished by the elimination of coil shielding.

The inductors are formed of large diameter wires 37 and 38, respectively, each having a specified number of turns to provide the low loss inductive properties required to produce the resonant frequency of that particular bridged-T circuit. The inductors 35 and 36 are supported upon low loss internally threaded coil forms 39 and 40, respectively. Two tuning slugs 41 and 42 which are threadedly received within the coil forms 39 and 40, respectively, are axially adjusted by a screw driver to provide vernier adjustment tuning. The tuning slugs may be formed of either an oxygen-free high conductivity copper material or of an iron material, such as carbonyl W. These materials were chosen for their low loss characteristics at the design frequencies of this embodiment of the invention, but other materials can be used to obtain optimum results with different design specifications. A single dual capacitor 43 (designated in FIGURE 1 as 18 and 19, in FIGURE 2 as 29 and 30, respectively) with a common electrical tie point 46 is employed to balance circuit capacity, and to facilitate the ease of tuning and adjustment. The capacities of these capacitors are varied by the tuning slugs 44 and 45. Two capacitors 47 and 48 (designated in FIGURE 1 as 16, and in FIGURE 2 as 32, respectively) are employed in the physical circuit as a matter of packaging convenience.

The coil form 40 is directly secured to the bight of the U-shaped support 51. A pair of posts 52 and 53 of electrical insulating material are secured to the bight of the U-shaped member and are provided with metallic studs (not shown) at their upper ends to receive both ends of the coil wire 37 and the capacitor leads to be electrically joined thereat by soldering and to be supported thereby. The upper ends or the legs of the U-shaped members are inwardly turned for mounting purposes as will be apparent from FIGURE 4.

The physical arrangement, lead length and capacity of the interconnecting wires of the bridged-T circuit are also critical. It has been established through experiment that by selection of the proper length and size of the interconnecting wires, along with the adjustment of the tuning slugs 41 and 42 within the inductors 35 and 36, respectively, and the adjustment of the tuning slugs 44 and 45 within the dual capacitor 43, that at resonance the bridged-T all-pass circuit possesses losses of less than ½ db, input capacities of less than 2 $\mu\mu$fds., and return losses of greater than 20 db.

Figure 4:
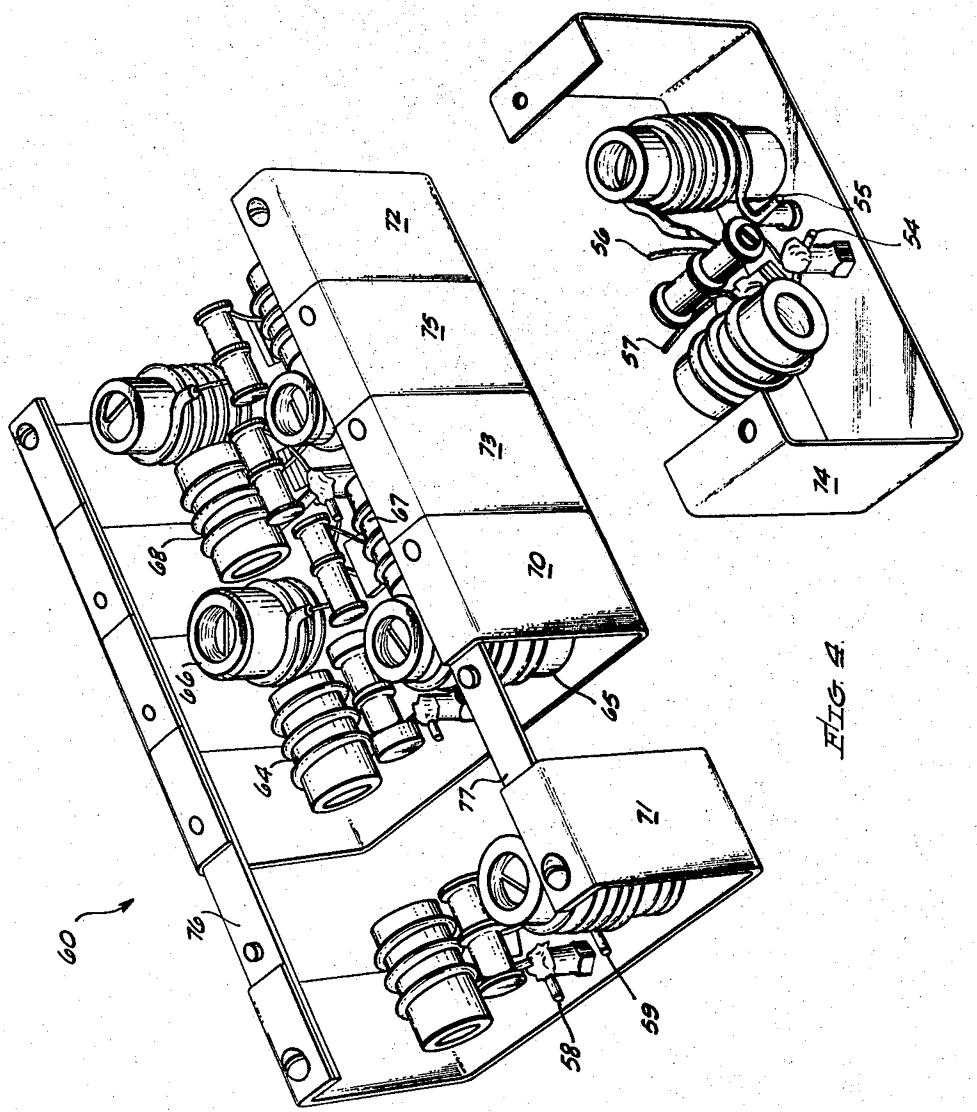
FIGURE 4 illustrates in reduced scale a phase equalization network construction embodying the principles of this invention having one filter circuit assembly removed therefrom.

As shown in FIGURE 4, a phase equalization device 60 comprises six individual bridged-T circuits 70, 71, 72, 73, 74 and 75. The bridged-T circuit 74 is shown disconnected from the phase equalization device 60 in order to illustrate the simple chassis construction that enables expeditious initial alignment and tuning. The individual bridged-T circuits are tuned to resonate at their respective desired frequency to obtain the flat gain with bandwidth required for the selected phase equalization characteristic. Commencing with the network 70 through to the network 75, the networks have increasing resonant frequencies. The bridged-T networks are assembled in a staggered sequence whereby resonant frequencies of physically adjacent circuits are sufficiently separated to minimize electrical interaction between adjacent circuits.

Individual bridged-T circuits are directly connected in tandem by hair-like wires 54 and 56, and wires 55 and 57 as illustrated in bridged-T network 74. The hair-like wires 54 and 56 are small diameter type, e.g., buss wire 24. The wires 54 and 56 provide a tuning function between individual bridged-T circuits. The length and size of each hair-like wire between bridged-T circuits is designed to resonate the stray capacity of the bridged-T circuits with its own self inductance such that a "$\pi$" type filter coupling is accomplished. The wires 55 and 57 connect the points of common reference potential.

As can be seen in FIGURE 4, adjacent inductors are arranged in quadrature to each other, i.e., an inductor 64 is arranged in quadrature to the inductors 65 and 66, the inductor 66 is arranged in quadrature to the inductors 64, 67 and 68, and so forth, for all bridged-T circuits, such that all adjacent inductors are positioned so that the magnetic fields of such adjacent inductors are in quadrature. This geometric arrangement of inductors minimizes the inductive coupling between inductors, eliminates the need for shielding, and thus provides less flat loss per unit delay.

It has been experimentally found that the phase equalization device 60, comprising six bridged-T circuits in tandem, having parabolic phase characteristics provided a linear time delay for approximately 133 nanoseconds pulse duration over a minimum bandwidth of fifty megacycles with an impedance level of ninety-three ohms. This experiment was performed at the passband frequency of seventy megacycles. Fifteen cascaded sextuple sections were then employed to provide approximately two microseconds delay. Furthermore, any plurality of bridged-T circuits may be cascaded to achieve the desired time delay.

The above phase equalization filter device operable with a suitable input driving source can provide parabolic phase characteristics as utilized in pulse compression systems demanding linear time dispersion, e.g., a chirp radar filter system. While only the results of a device providing parabolic phase characteristics has been described, the phase equalization techniques utilized to obtain those results may be employed with systems having either linear or higher order, i.e., cubic or above, phase characteristics that demand fixed or non-linear time delays, respectively.

It has also been experimentally found that the circuit loss versus frequency can be made almost flat. This characteristic of the phase equalization device is achieved by the fortunate balance that exists between (1) the anticipated coil losses with increasing frequency and (2) the special "$\pi$" loading circuit coupling. The insertion loss for a given bridged-T circuit is given to a good approximation by the following equation which has been dealt with extensively in the article "Synthesis of 'Band-Pass' All-Pass Time-Delay Networks With Graphical Approximation Techniques," Hughes Research Lab Report No. 114, February 1962. This equation indicates a non-flat insertion loss with frequency.

$$A(\bar{x}) = 8.69\left(\frac{\bar{w}_0}{2Q}\right)\left[\frac{2/\sigma_0}{1+\frac{\bar{x}}{\sigma_0}2}\right] \text{db}$$

where $$\bar{x} = \frac{(w-w_0)(w+w_0)}{2w_0}$$

$\bar{w}_0$=resonant frequency (zero damping)
Q=network quality factor
$\sigma_0$=damping factor Experimental measurements indicate that the special "$\pi$" coupling circuitry counteracts the individual "T" losses predicted by this equation. This indicated balance characteristic minimizes the need for extensive amplitude equalization which would entail subsequent increases in insertion loss.

Referring again to FIGURE 4, the phase equalization device 60 or combinations thereof can be employed to disperse, compress, or correct a deficiency in an input signal that would be applied to the input terminals 58 and 59. The dispersive action on the input signal is accomplished by design of the phase characteristics of the network such that the input energy with time is redistributed by selective phase shifting so that a wider output shape is produced. This same device 60 or combinations thereof could be further employed to compress or decode a long pulse to provide a narrower pulse by appropriate processing of the input spectrum prior to application of said signal to the input terminals 58 and 59.

As is shown in FIGURE 4, the bridged-T circuit 74 is disconnected from the phase equalization device 60. The network 74 can be easily removed or detached from the device 60. To remove such circuit 74, the input leads 54 and 55, and the output leads 56 and 57 are disconnected by conventional thermal means. The circuit 74 is then disconnected from the mounting bars 76 and 77.

The circuit 74 can be aligned to resonate at the desired frequency, and then placed in the device 60. The circuit 74 as well as any of the circuits comprising the device 60, can be disconnected, aligned, and returned to the device 60 in a matter of minutes, thus facilitating production type alignment and adjustment procedures.

While particular embodiments of the invention have been shown and described, it should be apparent that various modifications may be made therein which are obvious to a person skilled in the art. Therefore, the foregoing disclosure is intended as merely illustrative of the invention and should not be construed in a limiting sense.

What is claimed is:

1. A phase equalization filter device comprising:

a plurality of bridged-T circuits each having input connections and output connections and each having a plurality of impedance circuit branches;

respective first inductors connected in a first impedance circuit branch of each of said bridged-T circuits;

respective second inductors connected in a second impedance branch of each of said bridged-T circuits;

means supporting said first and said second inductors of each of said bridged-T circuits in proximity so that their respective magnetic fields are in quadrature to minimize inductive coupling; and means connecting said bridged-T circuits in an electrically cascaded relationship with a first inductor of one bridged-T circuit supported adjacent to a second inductor of a second bridged-T circuit and a second inductor of said first bridged-T circuit supported adjacent to a first inductor of said second bridged-T circuit in positions in which the magnetic fields of said adjacent inductors are in quadrature to minimize inductive coupling.

2. Apparatus as set forth in claim 1 in which said respective bridged-T circuits are of different frequencies and are cascaded in a sequence providing markedly different frequencies of adjacent bridged-T circuits.

3. Apparatus as set forth in claim 1 in which is provided means directly electrically connecting said bridged-T circuits in an electrically cascaded relationship.

4. A phase equalization filter device for providing large percentage bandwidth phase equalization in the intermediate frequency range, said device comprising:

a plurality of electronic bridged-T circuit means for phase shifting predetermined different frequencies;

means coupling said bridged-T circuits in a staggered sequence of markedly different increasing and decreasing resonant frequencies;

means electrically cascading said bridged-T circuit means to obtain large percentage bandwidth phase equalization;

respective first and second tunable inductor means within each bridged-T circuit positioned in quadrature to each other; and means mounting said respective tunable inductor means of each succeeding bridged-T circuit in quadrature to the respective adjacent tunable inductor means of each adjacent bridged-T circuits.

5. Apparatus as set forth in claim 4 in which is provided direct electrical coupling means between adjacent bridged-T circuits.

6. A phase equalization filter device as set forth in claim 4 wherein each said bridged-T network comprises:

a first and a second input terminal and a first and a second output terminal, said second input and output terminals being connected to a point of common reference potential, a resonant circuit having three parallel paths between said first input and output terminals, a first capacitor in the first path, a first tunable inductor in the second path, a second and third capacitor connected in series in the third path, and a second tunable inductor connected between said second and third capacitors and said point of common reference potential.

7. A phase equalization filter device as set forth in claim 4 wherein each said bridged-T network comprises:

a first and a second input terminal and a first and a second output terminal, said second input and output terminals being connected to a point of common reference potential, a resonant circuit having two parallel paths between said first input and output terminals, a first tunable inductor in the first path, a first and second capacitor connected in series in the second path, and a second tunable inductor and a third capacitor in series connected between said first and second capacitors and said point of common reference potential.

References Cited

UNITED STATES PATENTS

| | | | |
|---|---|---|---|
| 1,624,682 | 4/1927 | Shea | 333—75 |
| 2,805,398 | 9/1957 | Albersheim | 333—2 |
| 3,127,555 | 3/1964 | Honore | 323—75 |

| | | | |
|---|---|---|---|
| 3,105,209 | 9/1963 | Bundy | 333—78 |
| 3,129,396 | 4/1964 | Germain | 333—70 |

ELI LIEBERMAN, *Primary Examiner.*

C. BARAFF, *Assistant Examiner.*

U.S. Cl. X.R.

333—28, 70, 78